United States Patent
Yamasaki

(10) Patent No.: US 9,166,825 B2
(45) Date of Patent: Oct. 20, 2015

(54) ROUTING INFORMATION GENERATING APPARATUS, ROUTING INFORMATION GENERATING METHOD AND ROUTING INFORMATION GENERATING PROGRAM

(75) Inventor: Kosuke Yamasaki, Nagoya (JP)

(73) Assignee: Mitsubishi Electric Corporation, Tokyo (JP)

( * ) Notice: Subject to any disclaimer, the term of this patent is extended or adjusted under 35 U.S.C. 154(b) by 346 days.

(21) Appl. No.: 13/520,463

(22) PCT Filed: Jan. 5, 2010

(86) PCT No.: PCT/JP2010/050034
§ 371 (c)(1),
(2), (4) Date: Jul. 3, 2012

(87) PCT Pub. No.: WO2011/083565
PCT Pub. Date: Jul. 14, 2011

(65) Prior Publication Data
US 2013/0003742 A1    Jan. 3, 2013

(51) Int. Cl.
*H04L 12/28* (2006.01)
*H04L 12/56* (2006.01)
*H04L 12/26* (2006.01)
*H04L 12/66* (2006.01)
(Continued)

(52) U.S. Cl.
CPC .......... *H04L 12/66* (2013.01); *H04L 12/4625* (2013.01); *H04L 45/02* (2013.01)

(58) Field of Classification Search
CPC ......... H04L 45/02; H04L 45/26; H04L 45/54; H04L 45/60; H04W 40/248; H04W 40/246; H04W 40/24

USPC ........... 370/401, 389, 392, 338, 395.31, 315; 709/238, 242; 455/433
See application file for complete search history.

(56) References Cited

U.S. PATENT DOCUMENTS 5,881,241 A * 3/1999 Corbin .......................... 709/238
6,049,524 A * 4/2000 Fukushima et al. .......... 370/220
6,049,542 A * 4/2000 Prasad .......................... 370/386

(Continued)

FOREIGN PATENT DOCUMENTS

CN       1574748 A    2/2005
CN     101267391 A    9/2008

(Continued)

OTHER PUBLICATIONS

Chinese Office Action, mailed Mar. 28, 2014, Application No. 2010-800607052.

(Continued)

*Primary Examiner* — Wutchung Chu
(74) *Attorney, Agent, or Firm* — Sughrue Mion, PLLC; Richard C. Turner

(57) ABSTRACT

Network connecting sections of an own station deliver routing information notified from a relay section on the same base to network connecting sections of other stations of own networks. If new routing information is present in routing information received from the network connecting sections of the other stations, the network connecting sections of the own station notify the relay section on the same base of the routing information. The relay section updates, based on the routing information notified from the network connecting sections on the same base, routing information held by the relay section.

14 Claims, 20 Drawing Sheets

(51) Int. Cl.
*H04L 12/46* (2006.01)
*H04L 12/751* (2013.01)

(56) References Cited

U.S. PATENT DOCUMENTS

| | | | |
|---|---|---|---|
| 6,496,510 B1* | 12/2002 | Tsukakoshi et al. | 370/401 |
| 6,542,496 B1* | 4/2003 | Hirota et al. | 370/351 |
| 8,644,187 B2* | 2/2014 | Banks | 370/254 |
| 2001/0046227 A1* | 11/2001 | Matsuhira et al. | 370/355 |
| 2002/0172207 A1* | 11/2002 | Saito et al. | 370/400 |
| 2003/0007451 A1* | 1/2003 | Ochiai et al. | 370/218 |
| 2003/0026246 A1* | 2/2003 | Huang et al. | 370/352 |
| 2003/0156552 A1* | 8/2003 | Banker et al. | 370/266 |
| 2003/0193890 A1* | 10/2003 | Tsillas et al. | 370/216 |
| 2004/0230696 A1* | 11/2004 | Barach et al. | 709/238 |
| 2004/0236845 A1* | 11/2004 | Murakami et al. | 709/222 |
| 2005/0074010 A1* | 4/2005 | Kim et al. | 370/394 |
| 2005/0122981 A1* | 6/2005 | Nabae | 370/395.31 |
| 2005/0163091 A1* | 7/2005 | Nakasaku et al. | 370/338 |
| 2005/0169281 A1 | 8/2005 | Ko et al. | |
| 2006/0203828 A1* | 9/2006 | Kumazawa et al. | 370/400 |
| 2007/0115855 A1* | 5/2007 | Hu et al. | 370/254 |
| 2007/0124496 A1* | 5/2007 | Laamanen et al. | 709/238 |
| 2008/0031257 A1* | 2/2008 | He | 370/395.31 |

FOREIGN PATENT DOCUMENTS

| | | |
|---|---|---|
| JP | 6-348667 A | 12/1994 |
| JP | 7-273787 A | 10/1995 |
| JP | 2001-285351 A | 10/2001 |
| JP | 2002-158695 A | 5/2002 |
| JP | 2002-198989 A | 7/2002 |
| JP | 2005-218106 A | 8/2005 |

OTHER PUBLICATIONS

Taiwanese Office Action, dated Apr. 15, 2013; Application No. 099106389.
Chinese Office Action, mailed Nov. 3, 2014, Application No. 2010-800607052.
Communication dated May 25, 2015 from the State Intellectual Property Office of the P.R.C. in counterpart application No. 201080060705.2.

\* cited by examiner

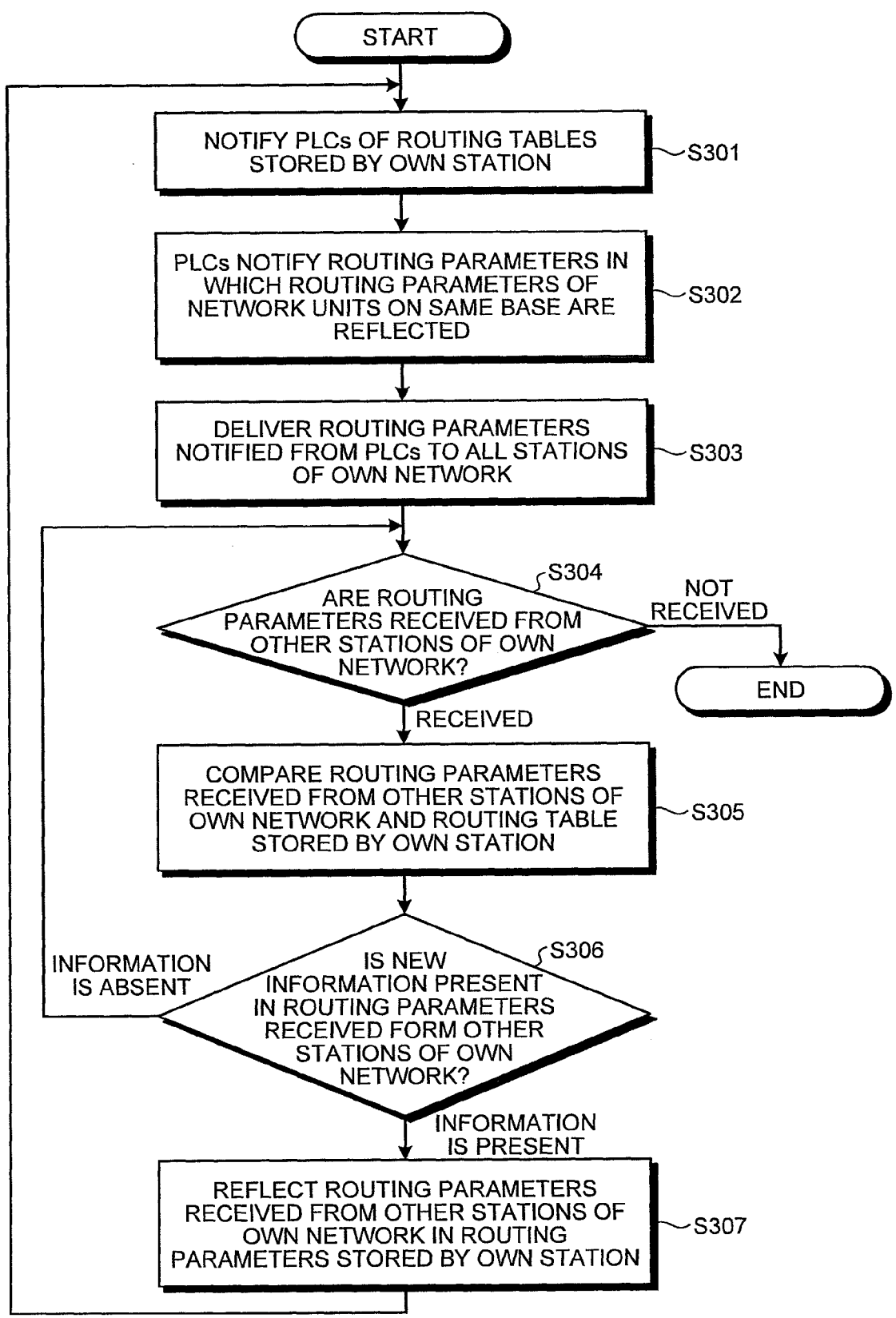

FIG.5

St2 → PLC1

|  | SETTING PRESENCE OR ABSENCE | RELAY PRESENCE OR ABSENCE | RELAY DESTINATION NETWORK NUMBER | RELAY DESTINATION STATION NUMBER | RELAY SOURCE STATION NUMBER |
|---|---|---|---|---|---|
| (a) NETWORK NUMBER [1] | 1 | 0 | 0 | 0 | 2 |
| NETWORK NUMBER [2] | 0 | 0 | 0 | 0 | 0 |
| NETWORK NUMBER [3] | 0 | 0 | 0 | 0 | 0 |

St3 → PLC2

|  | SETTING PRESENCE OR ABSENCE | RELAY PRESENCE OR ABSENCE | RELAY DESTINATION NETWORK NUMBER | RELAY DESTINATION STATION NUMBER | RELAY SOURCE STATION NUMBER |
|---|---|---|---|---|---|
| (b) NETWORK NUMBER [1] | 1 | 0 | 0 | 0 | 3 |
| NETWORK NUMBER [2] | 0 | 0 | 0 | 0 | 0 |
| NETWORK NUMBER [3] | 0 | 0 | 0 | 0 | 0 |

St4 → PLC2

|  | SETTING PRESENCE OR ABSENCE | RELAY PRESENCE OR ABSENCE | RELAY DESTINATION NETWORK NUMBER | RELAY DESTINATION STATION NUMBER | RELAY SOURCE STATION NUMBER |
|---|---|---|---|---|---|
| (c) NETWORK NUMBER [1] | 0 | 0 | 0 | 0 | 0 |
| NETWORK NUMBER [2] | 1 | 0 | 0 | 0 | 4 |
| NETWORK NUMBER [3] | 0 | 0 | 0 | 0 | 0 |

St5 → PLC3

|  | SETTING PRESENCE OR ABSENCE | RELAY PRESENCE OR ABSENCE | RELAY DESTINATION NETWORK NUMBER | RELAY DESTINATION STATION NUMBER | RELAY SOURCE STATION NUMBER |
|---|---|---|---|---|---|
| (d) NETWORK NUMBER [1] | 0 | 0 | 0 | 0 | 0 |
| NETWORK NUMBER [2] | 1 | 0 | 0 | 0 | 5 |
| NETWORK NUMBER [3] | 0 | 0 | 0 | 0 | 0 |

St6 → PLC3

|  | SETTING PRESENCE OR ABSENCE | RELAY PRESENCE OR ABSENCE | RELAY DESTINATION NETWORK NUMBER | RELAY DESTINATION STATION NUMBER | RELAY SOURCE STATION NUMBER |
|---|---|---|---|---|---|
| (e) NETWORK NUMBER [1] | 0 | 0 | 0 | 0 | 0 |
| NETWORK NUMBER [2] | 0 | 0 | 0 | 0 | 0 |
| NETWORK NUMBER [3] | 1 | 0 | 0 | 0 | 6 |

FIG.6

(a) PLC1

| | SETTING PRESENCE OR ABSENCE | RELAY PRESENCE OR ABSENCE | RELAY DESTINATION NETWORK NUMBER | RELAY DESTINATION STATION NUMBER | RELAY SOURCE STATION NUMBER |
|---|---|---|---|---|---|
| NETWORK NUMBER [1] | 1 | 0 | 0 | 0 | 2 |
| NETWORK NUMBER [2] | 0 | 0 | 0 | 0 | 0 |
| NETWORK NUMBER [3] | 0 | 0 | 0 | 0 | 0 |

(b) PLC2

| | SETTING PRESENCE OR ABSENCE | RELAY PRESENCE OR ABSENCE | RELAY DESTINATION NETWORK NUMBER | RELAY DESTINATION STATION NUMBER | RELAY SOURCE STATION NUMBER |
|---|---|---|---|---|---|
| NETWORK NUMBER [1] | 1 | 0 | 0 | 0 | 3 |
| NETWORK NUMBER [2] | 1 | 0 | 0 | 0 | 4 |
| NETWORK NUMBER [3] | 0 | 0 | 0 | 0 | 0 |

(c) PLC3

| | SETTING PRESENCE OR ABSENCE | RELAY PRESENCE OR ABSENCE | RELAY DESTINATION NETWORK NUMBER | RELAY DESTINATION STATION NUMBER | RELAY SOURCE STATION NUMBER |
|---|---|---|---|---|---|
| NETWORK NUMBER [1] | 0 | 0 | 0 | 0 | 0 |
| NETWORK NUMBER [2] | 1 | 0 | 0 | 0 | 5 |
| NETWORK NUMBER [3] | 1 | 0 | 0 | 0 | 6 |

| | SETTING PRESENCE OR ABSENCE | RELAY PRESENCE OR ABSENCE | RELAY DESTINATION NETWORK NUMBER | RELAY DESTINATION STATION NUMBER | RELAY SOURCE STATION NUMBER |
|---|---|---|---|---|---|
| NETWORK NUMBER [1] | 1 | 0 | 0 | 0 | 2 |
| NETWORK NUMBER [2] | 0 | 0 | 0 | 0 | 0 |
| NETWORK NUMBER [3] | 0 | 0 | 0 | 0 | 0 |

St3 → Nw1

(b)

| | SETTING PRESENCE OR ABSENCE | RELAY PRESENCE OR ABSENCE | RELAY DESTINATION NETWORK NUMBER | RELAY DESTINATION STATION NUMBER | RELAY SOURCE STATION NUMBER |
|---|---|---|---|---|---|
| NETWORK NUMBER [1] | 1 | 0 | 0 | 0 | 3 |
| NETWORK NUMBER [2] | 1 | 1 | 1 | 3 | 4 |
| NETWORK NUMBER [3] | 0 | 0 | 0 | 0 | 0 |

St4 → Nw2

(c)

| | SETTING PRESENCE OR ABSENCE | RELAY PRESENCE OR ABSENCE | RELAY DESTINATION NETWORK NUMBER | RELAY DESTINATION STATION NUMBER | RELAY SOURCE STATION NUMBER |
|---|---|---|---|---|---|
| NETWORK NUMBER [1] | 1 | 1 | 2 | 4 | 3 |
| NETWORK NUMBER [2] | 1 | 0 | 0 | 0 | 4 |
| NETWORK NUMBER [3] | 0 | 0 | 0 | 0 | 0 |

St5 → Nw2

(d)

| | SETTING PRESENCE OR ABSENCE | RELAY PRESENCE OR ABSENCE | RELAY DESTINATION NETWORK NUMBER | RELAY DESTINATION STATION NUMBER | RELAY SOURCE STATION NUMBER |
|---|---|---|---|---|---|
| NETWORK NUMBER [1] | 0 | 0 | 0 | 0 | 0 |
| NETWORK NUMBER [2] | 1 | 0 | 0 | 0 | 5 |
| NETWORK NUMBER [3] | 1 | 1 | 2 | 5 | 6 |

St6 → Nw3

(e)

| | SETTING PRESENCE OR ABSENCE | RELAY PRESENCE OR ABSENCE | RELAY DESTINATION NETWORK NUMBER | RELAY DESTINATION STATION NUMBER | RELAY SOURCE STATION NUMBER |
|---|---|---|---|---|---|
| NETWORK NUMBER [1] | 0 | 0 | 0 | 0 | 0 |
| NETWORK NUMBER [2] | 1 | 1 | 3 | 6 | 5 |
| NETWORK NUMBER [3] | 1 | 0 | 0 | 0 | 6 |

FIG.8

(a) PLC1

| NETWORK | SETTING PRESENCE OR ABSENCE | RELAY PRESENCE OR ABSENCE | RELAY DESTINATION NETWORK NUMBER | RELAY DESTINATION STATION NUMBER | RELAY SOURCE STATION NUMBER |
|---|---|---|---|---|---|
| NETWORK NUMBER [1] | 1 | 0 | 0 | 0 | 2 |
| NETWORK NUMBER [2] | 1 | 1 | 1 | 3 | 4 |
| NETWORK NUMBER [3] | 0 | 0 | 0 | 0 | 0 |

(b) PLC2

| | SETTING PRESENCE OR ABSENCE | RELAY PRESENCE OR ABSENCE | RELAY DESTINATION NETWORK NUMBER | RELAY DESTINATION STATION NUMBER | RELAY SOURCE STATION NUMBER |
|---|---|---|---|---|---|
| NETWORK NUMBER [1] | 1 | 0 | 0 | 0 | 3 |
| NETWORK NUMBER [2] | 1 | 0 | 0 | 0 | 4 |
| NETWORK NUMBER [3] | 1 | 1 | 2 | 5 | 6 |

(c) PLC3

| | SETTING PRESENCE OR ABSENCE | RELAY PRESENCE OR ABSENCE | RELAY DESTINATION NETWORK NUMBER | RELAY DESTINATION STATION NUMBER | RELAY SOURCE STATION NUMBER |
|---|---|---|---|---|---|
| NETWORK NUMBER [1] | 1 | 1 | 2 | 4 | 3 |
| NETWORK NUMBER [2] | 1 | 0 | 0 | 0 | 5 |
| NETWORK NUMBER [3] | 1 | 0 | 0 | 0 | 6 |

| | SETTING PRESENCE OR ABSENCE | SETTING PRESENCE OR ABSENCE | RELAY DESTINATION NETWORK NUMBER | RELAY DESTINATION STATION NUMBER | RELAY SOURCE STATION NUMBER |
|---|---|---|---|---|---|
| NETWORK NUMBER [1] | 1 | 0 | 0 | 0 | 2 |
| NETWORK NUMBER [2] | 1 | 1 | 1 | 3 | 4 |
| NETWORK NUMBER [3] | 0 | 0 | 0 | 0 | 0 |

(b) St3 → Nw1

| | SETTING PRESENCE OR ABSENCE | SETTING PRESENCE OR ABSENCE | RELAY DESTINATION NETWORK NUMBER | RELAY DESTINATION STATION NUMBER | RELAY SOURCE STATION NUMBER |
|---|---|---|---|---|---|
| NETWORK NUMBER [1] | 1 | 0 | 0 | 0 | 3 |
| NETWORK NUMBER [2] | 1 | 1 | 1 | 3 | 4 |
| NETWORK NUMBER [3] | 1 | 1 | 2 | 5 | 6 |

(c) St4 → Nw2

| | SETTING PRESENCE OR ABSENCE | SETTING PRESENCE OR ABSENCE | RELAY DESTINATION NETWORK NUMBER | RELAY DESTINATION STATION NUMBER | RELAY SOURCE STATION NUMBER |
|---|---|---|---|---|---|
| NETWORK NUMBER [1] | 1 | 1 | 2 | 4 | 3 |
| NETWORK NUMBER [2] | 1 | 0 | 0 | 0 | 4 |
| NETWORK NUMBER [3] | 1 | 1 | 2 | 5 | 6 |

(d) St5 → Nw2

| | SETTING PRESENCE OR ABSENCE | SETTING PRESENCE OR ABSENCE | RELAY DESTINATION NETWORK NUMBER | RELAY DESTINATION STATION NUMBER | RELAY SOURCE STATION NUMBER |
|---|---|---|---|---|---|
| NETWORK NUMBER [1] | 1 | 1 | 2 | 4 | 3 |
| NETWORK NUMBER [2] | 1 | 0 | 0 | 0 | 5 |
| NETWORK NUMBER [3] | 1 | 1 | 2 | 5 | 6 |

(e) St6 → Nw3

| | SETTING PRESENCE OR ABSENCE | SETTING PRESENCE OR ABSENCE | RELAY DESTINATION NETWORK NUMBER | RELAY DESTINATION STATION NUMBER | RELAY SOURCE STATION NUMBER |
|---|---|---|---|---|---|
| NETWORK NUMBER [1] | 1 | 1 | 2 | 4 | 3 |
| NETWORK NUMBER [2] | 1 | 1 | 3 | 6 | 5 |
| NETWORK NUMBER [3] | 1 | 0 | 0 | 0 | 6 |

FIG.10

PLC1

(a)

| | SETTING PRESENCE OR ABSENCE | RELAY PRESENCE OR ABSENCE | RELAY DESTINATION NETWORK NUMBER | RELAY DESTINATION STATION NUMBER | RELAY SOURCE STATION NUMBER |
|---|---|---|---|---|---|
| NETWORK NUMBER [1] | 1 | 0 | 0 | 0 | 2 |
| NETWORK NUMBER [2] | 1 | 1 | 1 | 3 | 4 |
| NETWORK NUMBER [3] | 1 | 1 | 2 | 5 | 6 |

PLC2

(b)

| | SETTING PRESENCE OR ABSENCE | RELAY PRESENCE OR ABSENCE | RELAY DESTINATION NETWORK NUMBER | RELAY DESTINATION STATION NUMBER | RELAY SOURCE STATION NUMBER |
|---|---|---|---|---|---|
| NETWORK NUMBER [1] | 1 | 0 | 0 | 0 | 3 |
| NETWORK NUMBER [2] | 1 | 0 | 0 | 0 | 4 |
| NETWORK NUMBER [3] | 1 | 1 | 2 | 5 | 6 |

PLC3

(c)

| | SETTING PRESENCE OR ABSENCE | RELAY PRESENCE OR ABSENCE | RELAY DESTINATION NETWORK NUMBER | RELAY DESTINATION STATION NUMBER | RELAY SOURCE STATION NUMBER |
|---|---|---|---|---|---|
| NETWORK NUMBER [1] | 1 | 1 | 2 | 4 | 3 |
| NETWORK NUMBER [2] | 1 | 0 | 0 | 0 | 5 |
| NETWORK NUMBER [3] | 1 | 0 | 0 | 0 | 6 |

|  | SETTING PRESENCE OR ABSENCE | RELAY PRESENCE OR ABSENCE | RELAY DESTINATION NETWORK NUMBER | RELAY DESTINATION STATION NUMBER | RELAY SOURCE STATION NUMBER |
| --- | --- | --- | --- | --- | --- |
| NETWORK NUMBER [1] | 1 | 0 | 0 | 0 | 2 |
| NETWORK NUMBER [2] | 1 | 1 | 1 | 3 | 4 |
| NETWORK NUMBER [3] | 1 | 1 | 2 | 5 | 6 |

FIG.12

ROUTING TABLE OF St3

|  | SETTING PRESENCE OR ABSENCE | RELAY PRESENCE OR ABSENCE | RELAY DESTINATION NETWORK NUMBER | RELAY DESTINATION STATION NUMBER | RELAY SOURCE STATION NUMBER |
| --- | --- | --- | --- | --- | --- |
| NETWORK NUMBER [1] | 1 | 0 | 0 | 0 | 3 |
| NETWORK NUMBER [2] | 1 | 0 | 0 | 0 | 4 |
| NETWORK NUMBER [3] | 1 | 1 | 2 | 5 | 6 |

FIG.14

(a) St7 → PLC4

| | SETTING PRESENCE OR ABSENCE | RELAY PRESENCE OR ABSENCE | RELAY DESTINATION NETWORK NUMBER | RELAY DESTINATION STATION NUMBER | RELAY SOURCE STATION NUMBER |
|---|---|---|---|---|---|
| NETWORK NUMBER [1] | 0 | 0 | 0 | 0 | 0 |
| NETWORK NUMBER [2] | 0 | 0 | 0 | 0 | 0 |
| NETWORK NUMBER [3] | 1 | 0 | 0 | 0 | 7 |
| NETWORK NUMBER [4] | 0 | 0 | 0 | 0 | 0 |

(b) St8 → PLC4

| | SETTING PRESENCE OR ABSENCE | RELAY PRESENCE OR ABSENCE | RELAY DESTINATION NETWORK NUMBER | RELAY DESTINATION STATION NUMBER | RELAY SOURCE STATION NUMBER |
|---|---|---|---|---|---|
| NETWORK NUMBER [1] | 0 | 0 | 0 | 0 | 0 |
| NETWORK NUMBER [2] | 0 | 0 | 0 | 0 | 0 |
| NETWORK NUMBER [3] | 0 | 0 | 0 | 0 | 0 |
| NETWORK NUMBER [4] | 1 | 0 | 0 | 0 | 8 |

FIG.15

PLC4

| | SETTING PRESENCE OR ABSENCE | RELAY PRESENCE OR ABSENCE | RELAY DESTINATION NETWORK NUMBER | RELAY DESTINATION STATION NUMBER | RELAY SOURCE STATION NUMBER |
|---|---|---|---|---|---|
| NETWORK NUMBER [1] | 0 | 0 | 0 | 0 | 0 |
| NETWORK NUMBER [2] | 0 | 0 | 0 | 0 | 0 |
| NETWORK NUMBER [3] | 1 | 0 | 0 | 0 | 7 |
| NETWORK NUMBER [4] | 1 | 0 | 0 | 0 | 8 |

| | SETTING PRESENCE OR ABSENCE | RELAY PRESENCE OR ABSENCE | RELAY DESTINATION NETWORK NUMBER | RELAY DESTINATION STATION NUMBER | RELAY SOURCE STATION NUMBER |
|---|---|---|---|---|---|
| NETWORK NUMBER [1] | 0 | 0 | 0 | 0 | 0 |
| NETWORK NUMBER [2] | 0 | 0 | 0 | 0 | 0 |
| NETWORK NUMBER [3] | 1 | 0 | 0 | 0 | 7 |
| NETWORK NUMBER [4] | 1 | 1 | 3 | 7 | 8 |

(b) St8 → Nw4

| | SETTING PRESENCE OR ABSENCE | RELAY PRESENCE OR ABSENCE | RELAY DESTINATION NETWORK NUMBER | RELAY DESTINATION STATION NUMBER | RELAY SOURCE STATION NUMBER |
|---|---|---|---|---|---|
| NETWORK NUMBER [1] | 0 | 0 | 0 | 0 | 0 |
| NETWORK NUMBER [2] | 0 | 0 | 0 | 0 | 0 |
| NETWORK NUMBER [3] | 1 | 1 | 4 | 8 | 7 |
| NETWORK NUMBER [4] | 1 | 0 | 0 | 0 | 8 |

FIG.17

(a) BEFORE RECEPTION

| | SETTING PRESENCE OR ABSENCE | RELAY PRESENCE OR ABSENCE | RELAY DESTINATION NETWORK NUMBER | RELAY DESTINATION STATION NUMBER | RELAY SOURCE STATION NUMBER |
|---|---|---|---|---|---|
| NETWORK NUMBER [1] | 1 | 1 | 2 | 4 | 3 |
| NETWORK NUMBER [2] | 1 | 0 | 0 | 0 | 5 |
| NETWORK NUMBER [3] | 1 | 0 | 0 | 0 | 6 |
| NETWORK NUMBER [4] | 0 | 0 | 0 | 0 | 0 |

(b) AFTER REFLECTION

| | SETTING PRESENCE OR ABSENCE | RELAY PRESENCE OR ABSENCE | RELAY DESTINATION NETWORK NUMBER | RELAY DESTINATION STATION NUMBER | RELAY SOURCE STATION NUMBER |
|---|---|---|---|---|---|
| NETWORK NUMBER [1] | 1 | 1 | 2 | 4 | 3 |
| NETWORK NUMBER [2] | 1 | 0 | 0 | 0 | 5 |
| NETWORK NUMBER [3] | 1 | 0 | 0 | 0 | 6 |
| NETWORK NUMBER [4] | 1 | 1 | 3 | 7 | 8 |

FIG.18

PLC3

| | SETTING PRESENCE OR ABSENCE | RELAY PRESENCE OR ABSENCE | RELAY DESTINATION NETWORK NUMBER | RELAY DESTINATION STATION NUMBER | RELAY SOURCE STATION NUMBER |
|---|---|---|---|---|---|
| NETWORK NUMBER [1] | 1 | 1 | 2 | 4 | 3 |
| NETWORK NUMBER [2] | 1 | 0 | 0 | 0 | 5 |
| NETWORK NUMBER [3] | 1 | 0 | 0 | 0 | 6 |
| NETWORK NUMBER [4] | 1 | 1 | 3 | 7 | 8 |

| | SETTING PRESENCE OR ABSENCE | RELAY PRESENCE OR ABSENCE | RELAY DESTINATION NETWORK NUMBER | RELAY DESTINATION STATION NUMBER | RELAY SOURCE STATION NUMBER |
|---|---|---|---|---|---|
| NETWORK NUMBER [1] | 1 | 1 | 2 | 4 | 3 |
| NETWORK NUMBER [2] | 1 | 0 | 0 | 0 | 5 |
| NETWORK NUMBER [3] | 1 | 1 | 2 | 5 | 6 |
| NETWORK NUMBER [4] | 1 | 1 | 3 | 7 | 8 |

(b) St6 → Nw3

| | SETTING PRESENCE OR ABSENCE | RELAY PRESENCE OR ABSENCE | RELAY DESTINATION NETWORK NUMBER | RELAY DESTINATION STATION NUMBER | RELAY SOURCE STATION NUMBER |
|---|---|---|---|---|---|
| NETWORK NUMBER [1] | 1 | 1 | 2 | 4 | 3 |
| NETWORK NUMBER [2] | 1 | 1 | 3 | 6 | 5 |
| NETWORK NUMBER [3] | 1 | 0 | 0 | 0 | 6 |
| NETWORK NUMBER [4] | 1 | 1 | 3 | 7 | 8 |

FIG.20

(a) PLC2

| | SETTING PRESENCE OR ABSENCE | RELAY PRESENCE OR ABSENCE | RELAY DESTINATION NETWORK NUMBER | RELAY DESTINATION STATION NUMBER | RELAY SOURCE STATION NUMBER |
|---|---|---|---|---|---|
| NETWORK NUMBER [1] | 1 | 0 | 0 | 0 | 3 |
| NETWORK NUMBER [2] | 1 | 0 | 0 | 0 | 4 |
| NETWORK NUMBER [3] | 1 | 1 | 2 | 5 | 6 |
| NETWORK NUMBER [4] | 1 | 1 | 3 | 7 | 8 |

(b) PLC4

| | SETTING PRESENCE OR ABSENCE | RELAY PRESENCE OR ABSENCE | RELAY DESTINATION NETWORK NUMBER | RELAY DESTINATION STATION NUMBER | RELAY SOURCE STATION NUMBER |
|---|---|---|---|---|---|
| NETWORK NUMBER [1] | 1 | 1 | 2 | 4 | 3 |
| NETWORK NUMBER [2] | 1 | 1 | 3 | 6 | 5 |
| NETWORK NUMBER [3] | 1 | 0 | 0 | 0 | 7 |
| NETWORK NUMBER [4] | 1 | 0 | 0 | 0 | 8 |

| | SETTING PRESENCE OR ABSENCE | RELAY PRESENCE OR ABSENCE | RELAY DESTINATION NETWORK NUMBER | RELAY DESTINATION STATION NUMBER | RELAY SOURCE STATION NUMBER |
|---|---|---|---|---|---|
| NETWORK NUMBER [1] | 1 | 0 | 0 | 0 | 3 |
| NETWORK NUMBER [2] | 1 | 1 | 1 | 3 | 4 |
| NETWORK NUMBER [3] | 1 | 1 | 2 | 5 | 6 |
| NETWORK NUMBER [4] | 1 | 1 | 3 | 7 | 8 |

St4 → Nw2

(b)

| | SETTING PRESENCE OR ABSENCE | RELAY PRESENCE OR ABSENCE | RELAY DESTINATION NETWORK NUMBER | RELAY DESTINATION STATION NUMBER | RELAY SOURCE STATION NUMBER |
|---|---|---|---|---|---|
| NETWORK NUMBER [1] | 1 | 1 | 2 | 4 | 3 |
| NETWORK NUMBER [2] | 1 | 0 | 0 | 0 | 4 |
| NETWORK NUMBER [3] | 1 | 1 | 2 | 5 | 6 |
| NETWORK NUMBER [4] | 1 | 1 | 3 | 7 | 8 |

St7 → Nw3

(c)

| | SETTING PRESENCE OR ABSENCE | RELAY PRESENCE OR ABSENCE | RELAY DESTINATION NETWORK NUMBER | RELAY DESTINATION STATION NUMBER | RELAY SOURCE STATION NUMBER |
|---|---|---|---|---|---|
| NETWORK NUMBER [1] | 1 | 1 | 2 | 4 | 3 |
| NETWORK NUMBER [2] | 1 | 1 | 3 | 6 | 5 |
| NETWORK NUMBER [3] | 1 | 0 | 0 | 0 | 7 |
| NETWORK NUMBER [4] | 1 | 1 | 3 | 7 | 8 |

St8 → Nw4

(d)

| | SETTING PRESENCE OR ABSENCE | RELAY PRESENCE OR ABSENCE | RELAY DESTINATION NETWORK NUMBER | RELAY DESTINATION STATION NUMBER | RELAY SOURCE STATION NUMBER |
|---|---|---|---|---|---|
| NETWORK NUMBER [1] | 1 | 1 | 2 | 4 | 3 |
| NETWORK NUMBER [2] | 1 | 1 | 3 | 6 | 5 |
| NETWORK NUMBER [3] | 1 | 1 | 4 | 8 | 7 |
| NETWORK NUMBER [4] | 1 | 0 | 0 | 0 | 8 |

FIG.22

PLC1

| | SETTING PRESENCE OR ABSENCE | RELAY PRESENCE OR ABSENCE | RELAY DESTINATION NETWORK NUMBER | RELAY DESTINATION STATION NUMBER | RELAY SOURCE STATION NUMBER |
|---|---|---|---|---|---|
| NETWORK NUMBER [1] | 1 | 0 | 0 | 0 | 2 |
| NETWORK NUMBER [2] | 1 | 1 | 1 | 3 | 4 |
| NETWORK NUMBER [3] | 1 | 1 | 2 | 5 | 6 |
| NETWORK NUMBER [4] | 1 | 1 | 3 | 7 | 8 |

| | SETTING PRESENCE OR ABSENCE | RELAY PRESENCE OR ABSENCE | RELAY DESTINATION NETWORK NUMBER | RELAY DESTINATION STATION NUMBER | RELAY SOURCE STATION NUMBER |
|---|---|---|---|---|---|
| NETWORK NUMBER [1] | 1 | 0 | 0 | 0 | 2 |
| NETWORK NUMBER [2] | 1 | 1 | 1 | 3 | 4 |
| NETWORK NUMBER [3] | 1 | 1 | 2 | 5 | 6 |
| NETWORK NUMBER [4] | 1 | 1 | 3 | 7 | 8 |

FIG.24

(a) PLC1

| NETWORK NUMBER | SETTING PRESENCE OR ABSENCE | RELAY PRESENCE OR ABSENCE | RELAY DESTINATION NETWORK NUMBER | RELAY DESTINATION STATION NUMBER | RELAY SOURCE STATION NUMBER |
|---|---|---|---|---|---|
| NETWORK NUMBER [1] | 1 | 0 | 0 | 0 | 2 |
| NETWORK NUMBER [2] | 1 | 1 | 1 | 3 | 4 |
| NETWORK NUMBER [3] | 1 | 1 | 2 | 5 | 6 |
| NETWORK NUMBER [4] | 1 | 1 | 3 | 7 | 8 |

(b) PLC2

| NETWORK NUMBER | SETTING PRESENCE OR ABSENCE | RELAY PRESENCE OR ABSENCE | RELAY DESTINATION NETWORK NUMBER | RELAY DESTINATION STATION NUMBER | RELAY SOURCE STATION NUMBER |
|---|---|---|---|---|---|
| NETWORK NUMBER [1] | 1 | 0 | 0 | 0 | 3 |
| NETWORK NUMBER [2] | 1 | 0 | 0 | 0 | 4 |
| NETWORK NUMBER [3] | 1 | 1 | 2 | 5 | 6 |
| NETWORK NUMBER [4] | 1 | 1 | 3 | 7 | 8 |

(c) PLC3

| NETWORK NUMBER | SETTING PRESENCE OR ABSENCE | RELAY PRESENCE OR ABSENCE | RELAY DESTINATION NETWORK NUMBER | RELAY DESTINATION STATION NUMBER | RELAY SOURCE STATION NUMBER |
|---|---|---|---|---|---|
| NETWORK NUMBER [1] | 1 | 1 | 2 | 4 | 3 |
| NETWORK NUMBER [2] | 1 | 0 | 0 | 0 | 5 |
| NETWORK NUMBER [3] | 1 | 0 | 0 | 0 | 6 |
| NETWORK NUMBER [4] | 1 | 1 | 3 | 7 | 8 |

(d) PLC4

| NETWORK NUMBER | SETTING PRESENCE OR ABSENCE | RELAY PRESENCE OR ABSENCE | RELAY DESTINATION NETWORK NUMBER | RELAY DESTINATION STATION NUMBER | RELAY SOURCE STATION NUMBER |
|---|---|---|---|---|---|
| NETWORK NUMBER [1] | 1 | 1 | 2 | 4 | 3 |
| NETWORK NUMBER [2] | 1 | 1 | 3 | 6 | 5 |
| NETWORK NUMBER [3] | 1 | 0 | 0 | 0 | 7 |
| NETWORK NUMBER [4] | 1 | 0 | 0 | 0 | 8 |

FIG.25

(a) PLC2

| NETWORK NUMBER | SETTING PRESENCE OR ABSENCE | RELAY PRESENCE OR ABSENCE | RELAY DESTINATION NETWORK NUMBER | RELAY DESTINATION STATION NUMBER | RELAY SOURCE STATION NUMBER |
|---|---|---|---|---|---|
| NETWORK NUMBER [1] | 1 | 0 | 0 | 0 | 3 |
| NETWORK NUMBER [2] | 1 | 0 | 0 | 0 | 4 |
| NETWORK NUMBER [3] | 0 | 1 | 2 | 5 | 6 |
| NETWORK NUMBER [4] | 0 | 1 | 3 | 7 | 8 |

(b) PLC4

| NETWORK NUMBER | SETTING PRESENCE OR ABSENCE | RELAY PRESENCE OR ABSENCE | RELAY DESTINATION NETWORK NUMBER | RELAY DESTINATION STATION NUMBER | RELAY SOURCE STATION NUMBER |
|---|---|---|---|---|---|
| NETWORK NUMBER [1] | 0 | 1 | 2 | 4 | 3 |
| NETWORK NUMBER [2] | 0 | 1 | 3 | 6 | 5 |
| NETWORK NUMBER [3] | 1 | 0 | 0 | 0 | 7 |
| NETWORK NUMBER [4] | 1 | 0 | 0 | 0 | 8 |

FIG.26

PLC1

| NETWORK NUMBER | SETTING PRESENCE OR ABSENCE | RELAY PRESENCE OR ABSENCE | RELAY DESTINATION NETWORK NUMBER | RELAY DESTINATION STATION NUMBER | RELAY SOURCE STATION NUMBER |
|---|---|---|---|---|---|
| NETWORK NUMBER [1] | 1 | 0 | 0 | 0 | 2 |
| NETWORK NUMBER [2] | 1 | 1 | 1 | 3 | 4 |
| NETWORK NUMBER [3] | 0 | 1 | 2 | 5 | 6 |
| NETWORK NUMBER [4] | 0 | 1 | 3 | 7 | 8 |

ROUTING INFORMATION GENERATING APPARATUS, ROUTING INFORMATION GENERATING METHOD AND ROUTING INFORMATION GENERATING PROGRAM

CROSS REFERENCE TO RELATED APPLICATIONS

This application is a National Stage of International Application No. PCT/JP2010/050034 filed on Jan. 5, 2010, the contents of all of which are incorporated herein by reference in their entirety.

FIELD

The present invention relates to a routing information generating apparatus, a routing information generating method, and a routing information generating program and, more particularly, to an automatic routing method for automatically generating routing parameters in a network system that includes a plurality of networks, performs relay using the routing parameters, and performs communication between different networks.

BACKGROUND

When communication is performed between different networks in a network system including a plurality of networks, it is necessary to set in advance routing parameters indicating relay information in a relay apparatus that performs relay for the networks. In a relay apparatus in the past, the routing parameters are manually set. Therefore, knowledge concerning the networks is necessary in setting the routing parameters. It is likely that a communication error is caused by a setting mistake of the routing parameters.

Therefore, as a method of performing communication between different networks in a control network system including a plurality of control networks, there is proposed a method of performing communication not depending on routing parameters by providing a communication path database in which network numbers and station numbers that communication passes from a start point station to an end point station of the communication are described in the order of the passage and describing path information extracted from the communication path database in a communication message (Patent Literature 1).

There is also proposed a method of creating routing tables of stations on a network by issuing, after establishing a control network system, a routing table creation command for creating a routing table from a station that is in a state in which a routing table is settable (Patent Literature 2).

CITATION LIST

Patent Literature

Patent Literature 1: Japanese Patent Application Laid-open No. 2002-198989
Patent Literature 2: Japanese Patent Application Laid-open No. H6-348667

SUMMARY

Technical Problem

However, in the method disclosed in Patent Literature 1, although it is unnecessary to perform time-consuming setting of a routing table, it is necessary to create, instead of the routing table, the communication path database in which the communication path information is stored. Therefore, there is a problem in that, when the hierarchy of networks is deep, because the path information is described in the communication message, a ratio of the path information in the communication message increases and data length to be transmitted decreases.

In the method disclosed in Patent Literature 2, although the routing table is automatically created, it is necessary to issue the routing table creation command to create the routing table. Therefore, there is a problem in that it is necessary to issue the routing table creation command as well when the configuration of a network system is changed, for example, at the time of addition of a network and create the routing table from the beginning.

The present invention has been devised in view of the above and it is an object of the present invention to obtain a routing information generating apparatus, a routing information generating method, and a routing information generating program that can reduce labor and time required for setting of routing parameters while flexibly coping with a change of the configuration of a network system.

Solution to Problem

There is provided a routing information generating apparatus according to an aspect of the present invention including: a routing-information delivering section configured to deliver routing information held by an own station to all stations connected to an own network; a routing-information comparing section configured to compare routing information delivered from another station of the own network and the routing information held by the own station; and a routing-information updating section configured to update, based on a result of the comparison by the routing-information comparing section, the routing information held by the own station.

Advantageous Effects of Invention

According to the present invention, there is an effect that it is possible to reduce labor and time required for setting of routing parameters while flexibly coping with a change of the configuration of a network system.

BRIEF DESCRIPTION OF DRAWINGS

FIG. 4 is a flowchart for explaining the operation of network units St2 to St6 shown in FIG. 2.

FIG. 5 is a diagram of routing tables of which the network units St2 to St6 notify the programmable controllers PLC1 to PLC3 on the same base during startup of the network system shown in FIG. 1.

FIG. 6 is a diagram of routing parameters in which the programmable controllers PLC1 to PLC3 reflect the routing tables shown in FIG. 5.

FIG. 7 is a diagram of routing parameters that the network units St2 to St6, which receive notification of the routing parameters shown in FIG. 6, deliver to all stations of own networks Nw1 to Nw3.

FIG. 8 is a diagram of routing parameters in which the programmable controllers PLC1 to PLC3 reflect routing tables shown in FIG. 7.

FIG. 9 is a diagram of routing parameters that the network units St2 to St6, which receive notification of the routing parameters shown in FIG. 8, deliver to all the stations of the own networks Nw1 to Nw3.

FIG. 10 is a diagram of routing parameters in which the programmable controllers PLC1 to PLC3 reflect routing tables shown in FIG. 9.

FIG. 11 is a diagram of routing parameters that the network unit St2, which receives notification of the routing parameters shown in FIG. 10, delivers to all the stations of the own network Nw1.

FIG. 12 is a diagram of a routing table held in the network unit St3 when the network unit St2, which receives the notification of the routing parameters shown in FIG. 10, delivers the routing parameters to all the stations of the own network Nw1.

FIG. 14 is a diagram of routing tables of which network units St7 and St8 notify a programmable controller PLC4.

FIG. 15 is a diagram of routing parameters in which the programmable controller PLC4 reflects the routing tables shown in FIG. 14.

FIG. 16 is a diagram of routing parameters that the network units St7 and St8, which receive notification of the routing parameters shown in FIG. 15, deliver to all stations of own networks Nw3 and Nw4.

FIG. 17 is a diagram of routing tables held in the network unit St6 before reception and after reflection of the routing parameters shown in FIG. 16(a).

FIG. 18 is a diagram of routing parameters in which the programmable controller PLC3 reflects a routing table shown in FIG. 16(a).

FIG. 19 is a diagram of routing parameters that the network units St5 and St6, which receive the routing parameters shown in FIG. 18, deliver to all the stations of the own networks Nw2 and Nw3.

FIG. 20 is a diagram of routing parameters in which the programmable controllers PLC2 and PLC4 reflect routing tables shown in FIG. 19.

FIG. 21 is a diagram of routing parameters that the network units St3, St4, St7, and St8, which receive notification of the routing parameters shown in FIG. 20, deliver to all the stations of the own networks Nw1 to Nw4.

FIG. 22 is a diagram of routing parameters in which the programmable controller PLC1 reflects a routing table shown in FIG. 21(a).

FIG. 23 is a diagram of routing parameters that the network unit St2, which receives notification of the routing parameters shown in FIG. 22, delivers to all the stations of the own network Nw1.

FIG. 24 is a diagram of routing parameters held in the programmable controllers PLC1 to PLC4 before parallel-off of the network units St5 and St6 and the programmable controller PLC3 shown in FIG. 13 in a fourth embodiment of the network system to which the routing information generating apparatus according to the present invention is applied.

FIG. 25 is a diagram of routing parameters held in the programmable controllers PLC2 and PLC4 after the parallel-off of the network units St5 and St6 and the programmable controller PLC3 shown in FIG. 13.

FIG. 26 is a diagram of routing parameters held in the programmable controller PLC1 after the parallel-off of the network units St5 and St6 and the programmable controller PLC3 shown in FIG. 13.

DESCRIPTION OF EMBODIMENTS

Embodiments of a routing information generating apparatus according to the present invention are explained in detail below based on the drawings. The present invention is not limited by the embodiments.

First Embodiment

Figure 1:
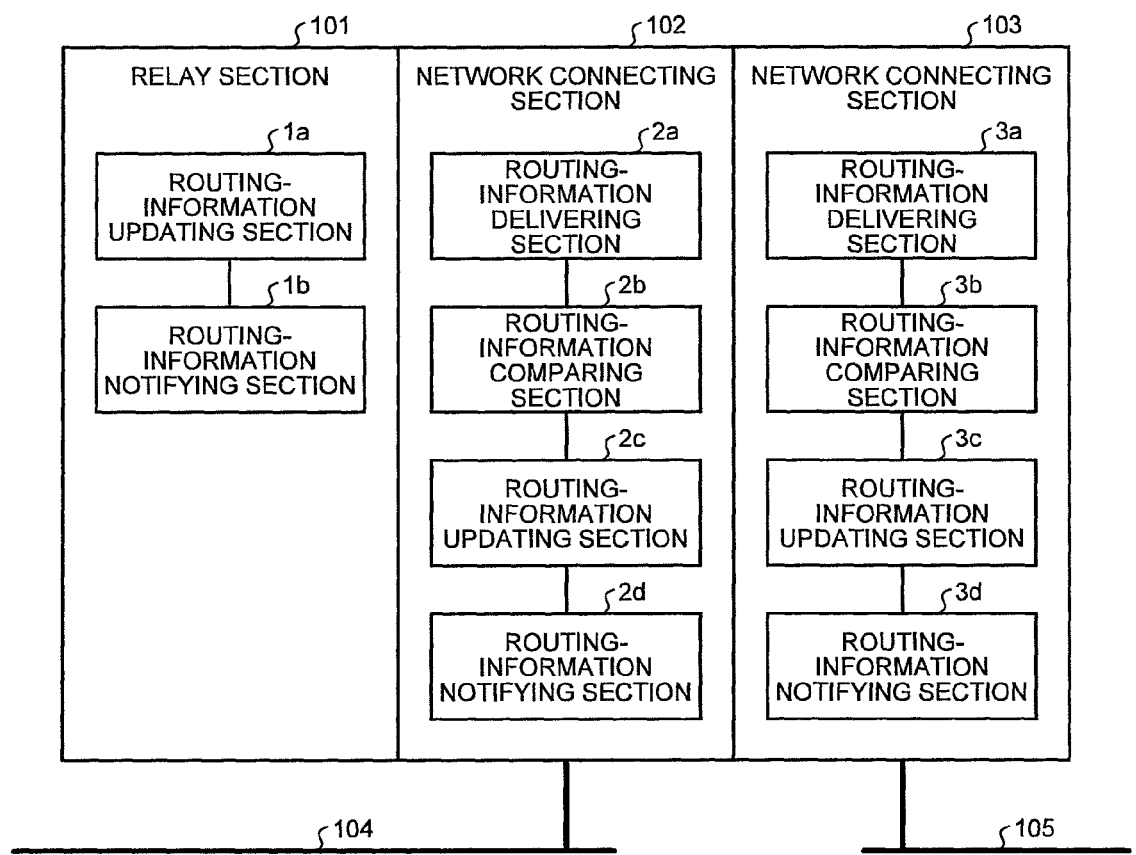
FIG. 1 is a block diagram of a schematic configuration of a first embodiment of a network system to which a routing information generating apparatus according to the present invention is applied.

FIG. 1 is a block diagram of a schematic configuration of a first embodiment of a network system to which the routing information generating apparatus according to the present invention is applied. In FIG. 1, in the network system, a relay section 101 and network connecting sections 102 and 103 respectively connected to networks 104 and 105 are provided. In the network system, a plurality of stations (also referred to as bases in the following explanation) each including the relay section 101 and the network connecting sections 102 and 103 can be provided.

In the relay section 101, a routing-information updating section la and a routing-information notifying section lb are provided. The routing-information updating section la can update, based on routing information notified from the network connecting sections 102 and 103 on the same base, routing information held by the relay section 101. The routing-information notifying section lb can notify the network connecting sections 102 and 103 on the same base of the routing information held by the relay section 101.

In the network connecting sections 102 and 103, routing-information updating sections 2c and 3c, routing-information notifying sections 2d and 3d, routing-information delivering sections 2a and 3a, and routing-information comparing sections 2b and 3b are respectively provided. The routing-information delivering sections 2a and 3a can respectively deliver routing information held by the own station to all stations connected to the own networks 104 and 105. The routing-information comparing sections 2b and 3b can respectively compare routing information delivered from other stations of the own networks 104 and 105 and the routing information held by the own stations. The routing-information updating sections 2c and 3c can respectively update, based on results of the comparison by the routing-information comparing sections 2b and 3b, the routing information held by the own station. The routing-information notifying sections 2d and 3d can respectively notify the relay section 101 of the routing information held by the network connecting sections 102 and 103 on the same base.

In the notification of the routing information between the relay section 101 and the network connecting sections 102 and 103 on the same base and transmission and reception between the network connecting sections 102 and 103 of the own networks 104 and 105, a routing table including items of setting presence or absence corresponding to network numbers to which the own station is connected, relay presence or absence of the network numbers, a relay destination network number, a relay destination station number, and a relay source station number can be used for each of the networks 104 and 105.

The network connecting sections 102 and 103 of the own station respectively deliver routing information updated based on routing information notified from the relay section 101 on the same base to network connecting sections of other stations of the own networks 104 and 105.

The network connecting sections 102 and 103 of the own station compare the routing information held by the network connecting sections 102 and 103 of the own station and routing information received from the network connecting sections of the other stations. If there is new routing information in the routing information received from the network connecting sections of the other stations, the network connecting sections 102 and 103 notify the relay section 101 on the same base of the new routing information.

The relay section 101 updates, based on the routing information notified from the network connecting sections 102 and 103 on the same base, the routing information held by the relay section 101 and notifies the network connecting sections 102 and 103 on the same base of the updated routing information.

The network connecting sections 102 and 103 of the own station update, based on the routing information notified from the relay section 101, the routing information held by the network connecting sections 102 and 103 and deliver the updated routing information to the network connecting sections of the other stations of the own networks 104 and 105. The network connecting sections 102 and 103 repeat the step of notifying the relay section 101 on the same base of routing information until no new routing information remains in the routing information received from the network connecting sections of the other stations.

Consequently, it is possible to automatically generate routing parameters of a network system communicated between the different networks 104 and 105. It is unnecessary to manually set routing parameters held in the relay section 101. Therefore, knowledge concerning the networks 104 and 105 is unnecessary in setting the routing parameters. Further, it is possible to prevent occurrence of a communication error due to a setting mistake of the routing parameters.

The routing-information updating sections 1a, 2c, and 3c, the routing-information notifying sections 1b, 2d, and 3d, the routing-information delivering sections 2a and 3a, and the routing-information comparing sections 2b and 3b can be realized by causing a computer to execute a computer program in which commands for carrying out processing performed in these blocks are described.

If the computer program is stored in a storage medium such as a CD-ROM, it is possible to realize, by inserting the storage medium into computers of the relay section 101 and the network connecting sections 102 and 103 and installing the computer program in the computers, processing performed in the routing-information updating sections 1a, 2c, and 3c, the routing-information notifying sections 1b, 2d, and 3d, the routing-information delivering sections 2a and 3a, and the routing-information comparing sections 2b and 3b.

When the computers are caused to execute the computer program in which the commands for carrying out the processing performed by the routing-information updating sections 1a, 2c, and 3c, the routing-information notifying sections 1b, 2d, and 3d, the routing-information delivering sections 2a and 3a, and the routing-information comparing sections 2b and 3b are described, a standalone computer can be caused to execute the computer program or a plurality of computers connected to a network can be caused to perform distributed processing of the computer program.

The embodiments of the present invention are explained below taking a programmable controller (PLC) as an example of the relay section 101 and taking network units as an example of the network connecting sections 102 and 103.

Second Embodiment

Figure 2:
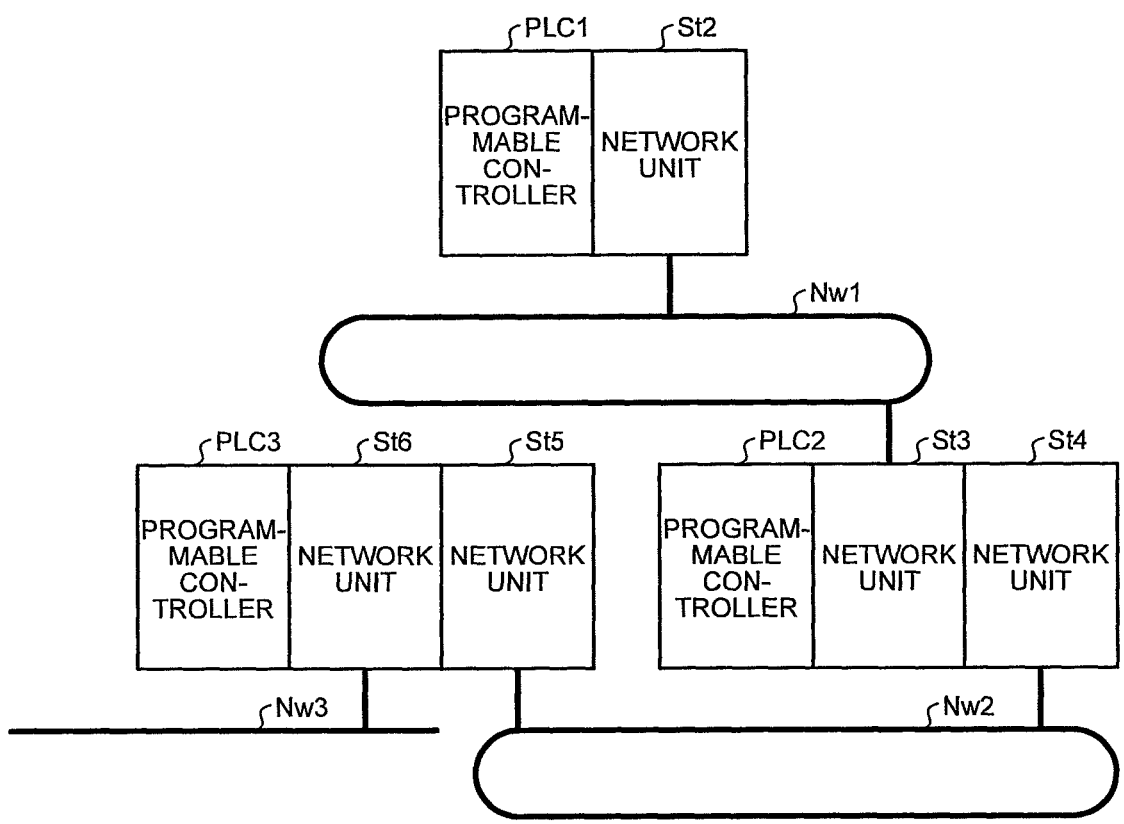
FIG. 2 is a block diagram of a schematic configuration of a second embodiment of the network system to which the routing information generating apparatus according to the present invention is applied.

FIG. 2 is a block diagram of a schematic configuration of a second embodiment of the network system to which the routing information generating apparatus according to the present invention is applied. In FIG. 2, in the network system, a network Nw1 of a network number 1, a network Nw2 of a network number 2, and a network Nw3 of a network number 3 are provided.

In the network Nw1, a station including a programmable controller PLC1 and a network unit St2 and a station including a programmable controller PLC2 and network units St3 and St4 are provided. In the network Nw2, a station including a programmable controller PLC2 and network units St3 and St4 and a station including the programmable controller PLC3 and network units St5 and St6 are provided. In the network Nw3, a station including a programmable controller PLC3 and network units St5 and St6 is provided.

The network units St2 and St3 are connected to the network Nw1. The network units St4 and St5 are connected to the network Nw2. The network unit St6 is connected to the network Nw3.

Figure 3:
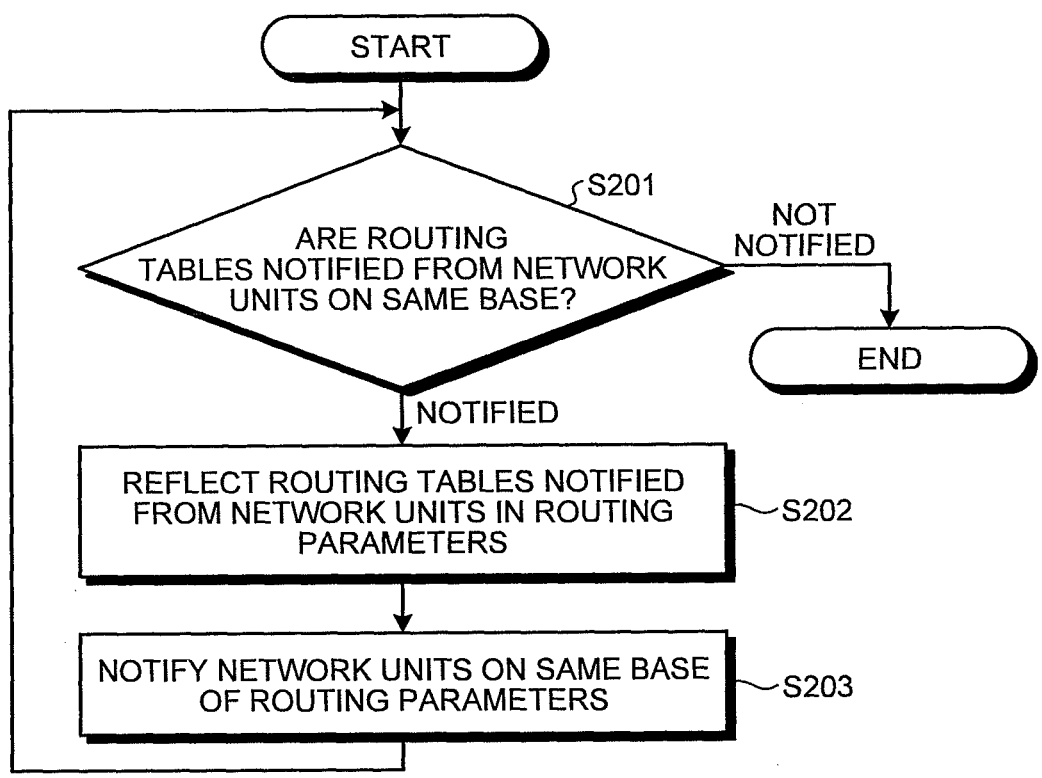
FIG. 3 is a flowchart for explaining the operation of programmable controllers PLC1 to PLC3 shown in FIG. 2.

FIG. 3 is a flowchart for explaining the operation of the programmable controllers PLC1 to PLC3 shown in FIG. 2. FIG. 4 is a flowchart for explaining the operation of the network units St2 to St6 shown in FIG. 2. In FIG. 3, when a control network system is started up, the network units St2 to St6 notify the programmable controllers PLC1 to PLC3 on the same base of corresponding routing tables (S301).

FIG. 5 is a diagram of the routing tables of which the network units St2 to St6 notify the corresponding programmable controllers PLC1 to PLC3 on the same base during the startup of the network system shown in FIG. 1.

FIG. 5(a) shows a routing table of which the network unit St2 notifies the programmable controller PLC1. FIG. 5(b) shows a routing table of which the network unit St3 notifies the programmable controller PLC2. FIG. 5(c) shows a routing table of which the network unit St4 notifies the programmable controller PLC2. FIG. 5(d) shows a routing table of which the network unit St5 notifies the programmable controller PLC3. FIG. 5(e) shows a routing table of which the network unit St6 notifies the programmable controller PLC3.

In FIG. 5, each of the network units St2 to St6 sets setting presence or absence corresponding to a network number, to which the own station is connected, to "1" to indicate setting presence and store an own station number in a relay source station number.

Subsequently, when the routing tables are notified from the network units St2 to St6 on the same base (S201), the programmable controllers PLC1 to PLC3 reflect information of the routing tables in routing parameters held by the programmable controllers PLC1 to PLC3 (S202). The programmable controllers PLC1 to PLC3 notify the network units St2 to St6 on the same base of the routing parameters in which the information is reflected (S203).

FIG. 6 is a diagram of routing parameters in which the programmable controllers PLC1 to PLC3 reflect the routing tables shown in FIG. 5.

FIG. 6(a) shows routing parameters in which the programmable controller PLC1 reflects the routing table shown in FIG. 5(a). FIG. 6(b) shows routing parameters in which the programmable controller PLC2 reflects the routing tables shown in FIGS. 5(b) and 5(c). FIG. 6(c) shows routing parameters in which the programmable controller PLC3 reflects the routing tables shown in FIGS. 5(d) and 5(e).

The network units St2 to St6, which receive the notification of the routing parameters from the programmable controllers PLC1 to PLC3, set, in the notified routing parameters, the relay presence or absence of network numbers of network units on the same base excluding the own stations, which is set to setting presence, to "1" to indicate relay presence, store own network numbers in a relay destination network number, store own station numbers in a relay destination station number, and transmit the routing parameters to all stations of the own networks Nw1 to Nw3 (S302 and S303).

FIG. 7 is a diagram of routing parameters that the network units St2 to St6, which receive the notification of the routing parameters shown in FIG. 6, deliver to all the stations of the own networks Nw1 to Nw3.

FIG. 7(a) shows routing parameters that the network unit St2 delivers to all the stations of the own network Nw1. FIG. 7(b) shows routing parameters that the network unit St3 delivers to all the stations of the own network Nw1. FIG. 7(c) shows routing parameters that the network unit St4 delivers to all the stations of the own network Nw2. FIG. 7(d) shows routing parameters that the network unit St5 delivers to all the stations of the own network Nw2. FIG. 7(e) shows routing parameters that the network unit St6 delivers to all the stations of the own network Nw3.

The network units St2 to St6, which receive routing parameters from the other stations of the corresponding own networks Nw1 to Nw3, compare the routing parameters received from the other stations of the own networks Nw1 to Nw3 and the routing parameters shown in FIG. 7 delivered to all the stations of the own networks Nw1 to Nw3 by the own stations (S304 and S305). If new information is present in the routing parameters received from the other stations of the own networks Nw1 to Nw3, the network units St2 to St6 reflect the routing parameters in the routing tables held by the own stations (S306 and S307).

The network units St2 to St6 notify the programmable controllers PLC1 to PLC3 on the same base of the routing tables in which the new information is reflected (S301). The programmable controllers PLC1 to PLC3 reflect the routing tables notified from the network units on the same base in routing parameters (S201 and S202). The programmable controllers PLC1 to PLC3 notify the network units St2 to St6 on the same base of the routing parameters in which the routing tables are reflected (S203).

FIG. 8 is a diagram of routing parameters in which the programmable controllers PLC1 to PLC3 reflect the routing tables shown in FIG. 7.

FIG. 8(a) shows routing parameters in which the programmable controller PLC1 reflects the routing table shown in FIG. 7(a). FIG. 8(b) shows routing parameters in which the programmable controller PLC2 reflects the routing tables shown in FIGS. 7(b) and 7(c). FIG. 8(c) shows routing parameters in which the programmable controller PLC3 reflects the routing tables shown in FIGS. 7(d) and 7(e).

The network units St2 to St6 that receive the notification from the programmable controllers PLC1 to PLC3 set, in the notified routing parameters, the relay presence or absence of the network numbers of the network units on the same base excluding the own stations, which is set to setting presence, to "1" to indicate relay presence, store the own network numbers in the relay destination network number, store the own station numbers in the relay destination station number, and deliver the routing parameters to all stations of the own networks Nw1 to Nw3 (S302 and S303).

FIG. 9 is a diagram of routing parameters that the network units St2 to St6, which receive the notification of the routing parameters shown in FIG. 8, deliver to all the stations of the own networks Nw1 to Nw3.

FIG. 9(a) shows routing parameters that the network unit St2 delivers to all the stations of the own network Nw1. FIG. 9(b) shows routing parameters that the network St3 delivers to all the stations of the own network Nw1. FIG. 9(c) shows routing parameters that the network unit St4 delivers to all the stations of the own network Nw2. FIG. 9(d) shows routing parameters that the network unit St5 delivers to all the stations of the own network Nw2. FIG. 9(e) shows routing parameters that the network unit St6 delivers to all the stations of the own network Nw3.

The network units St2 to St6, which receive routing parameters from the other stations of the own networks Nw1 to Nw3, compare the routing parameters received from the other stations of the own networks Nw1 to Nw3 and the routing parameters shown in FIG. 9 delivered to all the stations of the own networks Nw1 to Nw3 by the own stations (S304 and S305).

In the network unit St2, new information is present in the routing parameters that the network unit St3 delivers to the own network Nw1. Therefore, the network unit St2 reflects the received routing parameters in the routing table (S306 and S307). The network unit St2 notifies the programmable controller PLC2 of the routing table in which the routing parameters are reflected (S301).

On the other hand, in the other network units St3 to St6 excluding the network unit St2, new information is absent in the received routing parameters. Therefore, it is determined at S305 in FIG. 4 that new information is absent. The network units St3 to St6 wait for reception of routing parameters from the other stations of the own networks Nw1 to Nw3 at S304.

The programmable controller PLC1, which receives the notification of the routing table from the network unit St2, reflects the routing table in routing parameters (S201 and S202). The programmable controller PLC1 notifies the network unit St2 present on the same base of the routing parameters in which the routing table is reflected (S203). The network unit St2, which receives the notification from the programmable controller PLC1, delivers the notified routing parameters to all the stations of the own network Nw1 (S302 and S303).

FIG. 10 is a diagram of routing parameters in which the programmable controllers PLC1 to PLC3 reflect the routing tables shown in FIG. 9.

FIG. 10(a) shows routing parameters in which the programmable controller PLC1 reflects the routing table shown in FIG. 9(a). FIG. 10(b) shows routing parameters in which the programmable controller PLC2 reflects the routing tables shown in FIGS. 9(b) and 9(c). FIG. 10(c) shows routing parameters in which the programmable controller PLC3 reflects the routing tables shown in FIGS. 9(d) and 9(e).

FIG. 11 is a diagram of routing parameters that the network unit St2, which receives notification of the routing parameters shown in FIG. 10, delivers to all the stations of the own network Nw1.

The network unit St3 receives the routing parameters delivered from the network unit St2 (S304 and S305). The network unit St3 compares the routing parameters with the routing table held by the own station (S305). Because new information is absent, it is determined at S306 in FIG. 4 that new information is absent. The network unit St3 waits for reception of routing parameters from the other stations of the own network Nw1 at S304.

FIG. 12 is a diagram of a routing table held in the network unit St3 when the network unit St2, which receives the notification of the routing parameters shown in FIG. 10, delivers the routing parameters to all the stations of the own network Nw1.

The network units St2 to St6 do not receive routing parameters from the other stations of the own networks Nw1 to Nw3 anymore. It is determined at S304 in FIG. 4 that no routing parameter is received. The automatic routing ends. The programmable controllers PLC1 to PLC3 do not receive routing tables from the network units St2 to St6 on the same base anymore. It is determined at S201 in FIG. 3 that no routing table is notified. The generation of routing parameters ends.

Third Embodiment

Figure 13:
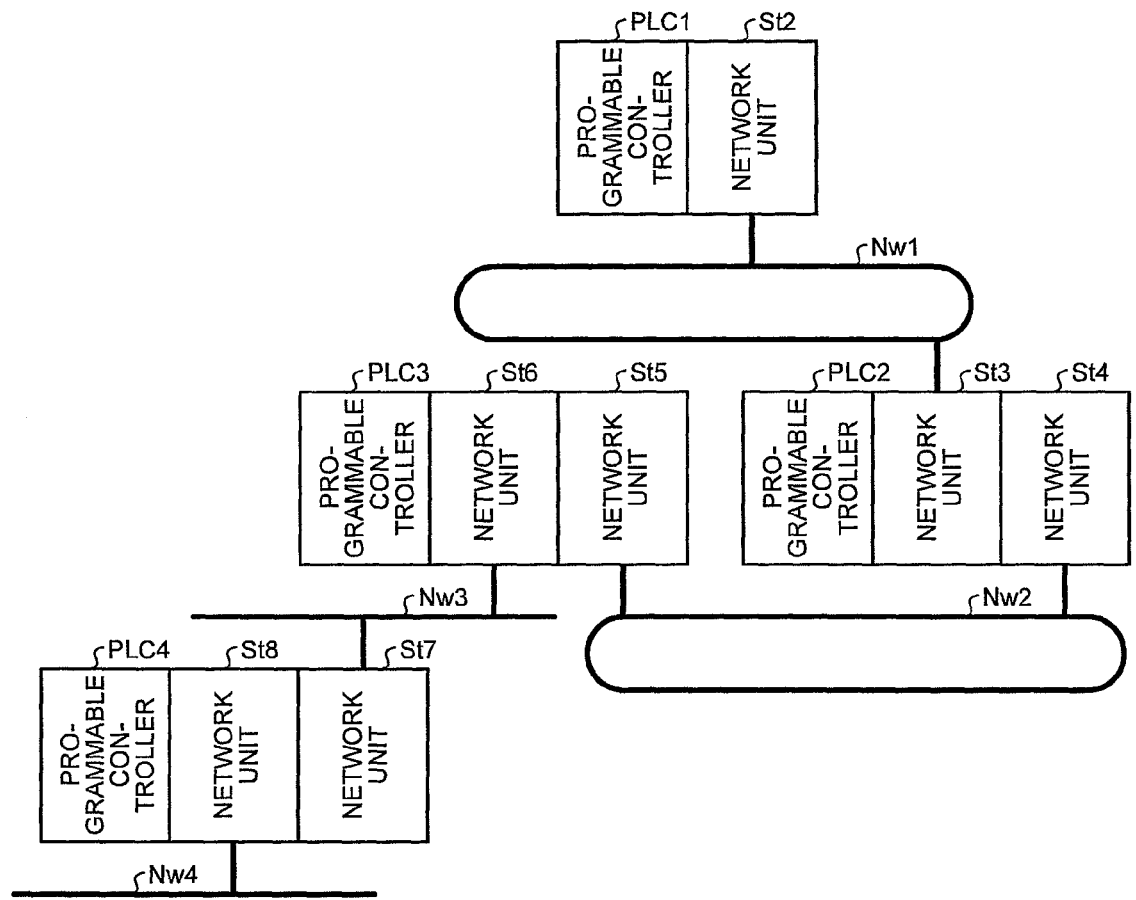
FIG. 13 is a block diagram of a schematic configuration of a third embodiment of the network system to which the routing information generating apparatus according to the present invention is applied.

FIG. 13 is a block diagram of a schematic configuration of a third embodiment of the network system to which the routing information generating apparatus according to the present invention is applied. In FIG. 13, a programmable controller PLC4 and network units St7 and St8 are added to the network system shown in FIG. 1 in which the routing parameters are already generated in the programmable controllers PLC1 to PLC3. The network unit St7 is connected to the network Nw3 of the network number 3. The network unit St8 is connected to a network Nw4 of a network number 4. The programmable controller PLC4 is arranged on the same base as the network units St7 and St8.

The network unit St7 sets the setting presence or absence of the network number 3 in the routing table to "1", stores an own station number "7" in the relay source number, and notifies the programmable controller PLC4 of the routing table (S301). The network unit St8 sets the setting presence or absence of the network number 4 in the routing table to "1", stores an own station number "8" in the relay source station number, and notifies the programmable controller PLC4 of the routing table (S301).

FIG. 14 is a diagram of routing tables of which the network units St7 and St8 notify the programmable controller PLC4.

FIG. 14(a) shows a routing table of which the network unit St7 notifies the programmable controller PLC4. FIG. 14(b) shows a routing table of which the network unit
St8 notifies the programmable controller PLC4.

The programmable controller PLC4 reflects routing tables notified from the network units St7 and St8 in routing parameters (S201 and S202). The programmable controller PLC4 notifies the network units St7 and St8 on the same base of the routing parameters (S203).

FIG. 15 is a diagram of routing parameters in which the programmable controller PLC4 reflects the routing tables shown in FIG. 14.

The network units St7 and St8, which receive notification of the routing parameters from the programmable controller PLC4, set, in the notified routing parameters, the relay presence or absence of the network numbers of the network units on the same base excluding the own station, which is set to setting presence, to "1", store the own in the relay destination network number, store the own station numbers in the relay destination station number, and deliver the routing parameters to all stations of the own networks Nw3 to Nw4 (S302 and S303).

FIG. 16 is a diagram of routing parameters that the network units St7 and St8, which receive notification of the routing parameters shown in FIG. 15, deliver to all the stations of the own networks Nw3 and Nw4.

FIG. 16(a) shows routing parameters that the network unit St7 delivers to all the stations of the own network Nw3. FIG. 16(b) shows routing parameters that the network unit St8 delivers to all the stations of the own network Nw4.

The network unit St6 connected to the own network Nw3 receives routing parameters from the network unit St7 and compares routing parameters received from the other stations of the own network Nw3 and the routing table held by the own station (S304 and S305). Because new information concerning the network Nw4 is present, the network unit St6 reflects the routing parameters in the routing table (S306 and S307).

The network unit St6 notifies the programmable controller PLC3 of the routing table in which the routing parameters are reflected (S301).

FIG. 17(a) is a diagram of a routing table held in the network unit St6 before reception of the routing parameters shown in FIG. 16(a). FIG. 17(b) is a diagram of a routing table held in the network unit St6 after reflection of the routing parameters shown in FIG. 16(a).

The programmable controller PLC3 reflects the routing table notified from the network unit St6 in routing parameters (S202). The programmable controller PLC3 notifies the network units St5 and St6 on the same base of the routing parameters in which the routing table is reflected (S203).

FIG. 18 is a diagram of routing parameters in which the programmable controller PLC3 reflects the routing table shown in FIG. 16(a).

The network units St5 and St6 set, in the routing parameters notified from the programmable controller PLC3, the relay presence or absence of the network numbers of the network units on the same base excluding the own station to "1", hold the own network numbers in the relay destination network number, store the own station numbers in the relay destination station number, and deliver the routing parameters to the own networks Nw2 to Nw3 (S302 and S303).

FIG. 19 is a diagram of routing parameters that the network units St5 and St6, which receive notification of the routing parameters shown in FIG. 18, deliver to all the stations of the own networks Nw2 and Nw3.

FIG. 19(a) shows routing parameters that the network unit St5 delivers to all the stations of the own network Nw2. FIG. 19(b) shows routing parameters that the network unit St6 delivers to all the stations of the own network Nw3.

The network units St4 and St7 respectively receive the routing parameters delivered by the network units St5 and St6 and compare the routing parameters respectively with the routing tables of the own stations (S304 and S305). Because new information is present, the network units St4 and St7 respectively notify the programmable controllers PLC2 and PLC4 of the routing tables in which the received routing parameters are reflected (S306 to S308).

The programmable controllers PLC2 and PLC4 reflect the routing tables respectively notified from the network units St4 and St7 in routing parameters (S201 and S202). The programmable controllers PLC2 and PLC4 notify the network units St3, St4, St7, and St8 on the same base of the routing parameters in which the routing tables are reflected (S203).

FIG. 20 is a diagram of routing parameters in which the programmable controllers PLC2 and PLC4 reflect the routing tables shown in FIG. 19.

FIG. 20(a) shows routing parameters in which the programmable controller PLC2 reflects the routing table shown in FIG. 19(a). FIG. 20(b) shows routing parameters in which the programmable controller PLC4 reflects the routing table shown in FIG. 19(b).

The network units St3 and St4, which receive the notification from the programmable controller PLC2, and the network units St7 and St8, which receive the notification from the programmable controller PLC4, set, in the routing parameters notified from the programmable controllers PLC2 and PLC4, the relay presence or absence of the network numbers of the network units on the same base excluding the own stations to "1", store the own network numbers in the relay destination network number, and hold the own station numbers in the relay destination station number. The network unit St3 delivers the routing parameters to all the stations of the own network Nw1, the network unit St4 delivers the routing parameters to all the stations of the own network Nw2, the network unit St7 delivers the routing parameters to all the stations of the own network Nw3, and the network unit St8 delivers the routing parameters to all the stations of the network Nw4 (S302 and S303).

FIG. 21 is a diagram of routing parameters that the network stations St3, St4, St7, and St8, which receive notification of the routing parameters shown in FIG. 20, deliver to all the stations of the own networks Nw1 to Nw4.

FIG. 21(a) shows routing parameters that the network unit St3 delivers to all the stations of the own network Nw1. FIG. 21(b) shows routing parameters that the network unit St4 delivers to all the stations of the own network Nw2. FIG. 21(c) shows routing parameters that the network unit St7 delivers to all the stations of the own network Nw3. FIG. 21(d) shows routing parameters that the network unit St8 delivers to all the stations of the own network Nw4.

The network units St2, St5, and St6, which receive routing parameters from the other stations of the own networks Nw1 to Nw4, compare the routing parameters received from the other stations of the own networks Nw1 to Nw4 and the routing tables held by the own stations (S304 and S305). Because new information is included in the received routing parameters in the network unit St2, the network unit St2 notifies the programmable controller PLC1 of a routing table in which the routing parameters are reflected (S306, S307, and S301). On the other hand, because new information is not included in the received routing parameters in the network units St5 and St6, the network units St5 and St6 do not notify the programmable controller PLC3 of routing tables and wait for reception of routing parameters from the other stations of the own networks Nw2 and Nw3 (S304 to S306).

The programmable controller PLC1 reflects the routing table notified from the network unit St2 in routing parameters (S201 and S202). The programmable controller PLC1 notifies the network unit St2 of the routing parameters in which the routing table is reflected (S203). Because another network unit excluding the own station is absent on the same base, the network unit St2 delivers the routing parameters notified from the programmable controller PLC1 to all the stations of the own network Nw1 (S302 and S303).

FIG. 22 is a diagram of routing parameters in which the programmable controller PLC1 reflects the routing table shown in FIG. 21(a).

FIG. 23 is a diagram of routing parameters that the network unit St2, which receives notification of the routing parameters shown in FIG. 22, delivers to all the stations of the own network Nw1.

The network unit St3 receives routing parameters from the network unit St2 (S304). The network unit St3 compares the routing parameters with the routing table of the own station (S305). Because new information is absent, the network unit St3 does not notify the programmable controller PLC2 of the routing parameters (S306 and S304). At this stage, the programmable controllers PLC1 to PLC4 do not receive notification of routing tables from the network units St2 to St8 on the same base anymore. The network unit St2 to St8 do not receive routing parameters from the other stations of the own networks Nw1 to Nw4 anymore. The routing parameter generation ends.

Fourth Embodiment

In the network system shown in FIG. 13, it is assumed that a relay station including the programmable controller PLC3 and the network units St5 and St6 is paralleled off from the network by power-off.

FIG. 24 is a diagram of routing parameters held in the programmable controllers PLC1 to PLC4 before the parallel-off of the network units St5 and St6 and the programmable controller PLC3 shown in FIG. 13 in a fourth embodiment of the network system to which the routing information generating apparatus according to the present invention is applied.

FIG. 24(a) shows routing parameters held in the programmable controller PLC1. FIG. 24(b) shows routing parameters held in the programmable controller PLC2. FIG. 24(c) shows routing parameters held in the programmable controller PLC3. FIG. 24(d) shows routing parameters held in the programmable controller PLC4.

When the relay station including the programmable controller PLC3 and the network units St5 and St6 shown in FIG. 13 is paralleled off by power-off, the network unit St4 recognizes the parallel-off of the network unit St5 in the network Nw2. The network unit St4 notifies the programmable controller PLC2 of a routing table in which the setting presence or absence of the network number 3 for which the network unit St5 of the network Nw2 performs relay is set to "0" and the setting presence or absence of the network number 4 for which the network number 3 performs relay is set to "0". The programmable controller PLC2 reflects the routing table notified from the network unit St4 in the routing parameters held in the own station.

The network unit St7 recognizes the parallel-off of the network unit St6 in the network Nw3. The network unit St7 notifies the programmable controller PLC4 of a routing table in which the setting presence or absence of the network number 2 for which the network unit St6 of the network Nw3 performs relay is set to "0" and the setting presence or absence of the network number 1 for which the network number 2 performs relay is set to "0". The programmable controller PLC4 reflects the routing table notified from the network unit St7 in the routing parameters held in the own station.

FIG. 25 is a diagram of routing parameters held in the programmable controllers PLC2 and PLC4 after the parallel-off of the network units St5 and St6 and the programmable controller PLC3 shown in FIG. 13.

FIG. 25(a) shows routing parameters held in the programmable controller PLC2. FIG. 25(b) shows routing parameters held in the programmable controller PLC4.

The programmable controllers PLC2 and PLC4 notify the network units St3, St4, St7, and St8 on the same base of the routing parameters in which the routing tables are reflected. The network units St3, St4, St7, and St8, which receive the notification, transmit the routing parameters notified from the programmable controllers PLC2 and PLC4 to all the stations of the own networks Nw1 to Nw4.

The network unit St2 notifies the programmable controller PLC1 of the routing table in which the routing parameters received from the network unit St3 are reflected. The programmable controller PLC1 reflects the routing table notified from the network unit St2 in the routing parameters held in the programmable controller PLC1.

FIG. 26 is a diagram of routing parameters held in the programmable controller PLC1 after the parallel-off of the network units St5 and St6 and the programmable controller PLC3 shown in FIG. 13.

As explained above, according to the embodiments, it is unnecessary to manually set routing parameters for each programmable controller. It is possible to realize facilitation of establishment of a network system and eliminate a communication error due to a parameter setting mistake. When abnormality occurs in a path, if a communicable path is present, it is possible to continue communication by setting the communicable path as a routing parameter.

INDUSTRIAL APPLICABILITY

As explained above, the routing information generating apparatus according to the present invention can reduce labor and time required for setting of routing parameters while flexibly coping with a change of the configuration of a network system. The routing information generating apparatus is suitable for a method of automatically generating routing parameters of a network system that includes a plurality of networks, performs relay using routing parameters, and performs communication between different networks.

REFERENCE SIGNS LIST

101 RELAY SECTION
102, 103 NETWORK CONNECTING SECTIONS
104, 105, Nw1 to Nw4 NETWORKS
PLC1 to PLC4 PROGRAMMABLE CONTROLLERS
St2 to St8 NETWORK UNITS
1a, 2c, 3c ROUTING-INFORMATION UPDATING SECTIONS
1b, 2d, 3d ROUTING-INFORMATION NOTIFYING SECTIONS
2a, 3a ROUTING-INFORMATION DELIVERING SECTIONS
2b, 3b ROUTING-INFORMATION COMPARING SECTIONS

The invention claimed is:

1. A routing information generating apparatus comprising:
a relay section; and
at least one network connecting section connected to a respective network from a plurality of networks,
wherein each of the at least one network connecting section comprises:
a routing-information delivering section configured to set routing information held by the network connecting section based on routing information received from a relay section and configured to deliver the routing information held by the network connecting section to stations connected to an own network;
a routing-information comparing section configured to compare the routing information delivered from another station of the own network and the routing information held by the network connecting section;
a routing-information updating section configured to update, based on a result of the comparison by the routing-information comparing section, the routing information held by the network connecting station; and
a routing-information notifying section configured to notify the relay section on a same base of the routing information held by the network connecting section,
wherein the relay section updates, based on the routing information notified from the network connecting section on the same base, routing information held by the relay section, and notifies the network connecting section on the same base of the updated routing information held by the relay section, and
wherein the network connecting section updates, based on the updated routing information notified from the relay section, the routing information held by the network connecting section, delivers the updated routing information to the network connecting section of the another station, and repeats the notifying the relay section on the same base of the routing information until no new routing information remains in routing information received from the another station.

2. A non-transitory computer readable storage medium storing a program that, when executed by a computer, causes the computer to function as the routing information generating an apparatus according to claim 1.

3. A routing information generating method in a network system including a plurality of stations each of which includes a relay section, which hold routing information for each of the stations, and one or a plurality of network connecting sections, each connected to a network, the routing information generating method comprising:
a step of the network connecting section of an own station setting routing information held by the own station and delivering the routing information updated based on routing information notified from the relay station on a same base to the network connecting section of another station of an own network;
a step of the network connecting section of the own station notifying, if new routing information is present in routing information received from the network connecting section of the another station, the relay section on the same base of the routing information;
a step of the relay section updating, based on routing information notified from the network connecting section on the same base, routing information held by the relay section; and
a step of the relay section notifying the network connecting section on the same base of the updated routing information held by the relay section,
wherein the network connecting section of the own station updates, based on the updated routing information notified from the relay section, the routing information held by the network connecting section, delivers the updated routing information to the network connecting section of the another station, and repeats the step of notifying the relay section on the same base of the routing information until no new routing information remains in routing information received from the network connecting section of the another station.

4. The routing information generating method according to claim 3, further comprising:
a step of the network connecting section of the own station recognizing parallel-off of the network connecting section of the another station of the own network;
a step of the network connecting section of the own station disabling routing information to a network for which the paralleled-off connecting section performs relay; and
a step of the network connecting section of the own station notifying the relay section on the same base of the disabled routing information.

5. The routing information generating method according to claim 3, wherein each of the plurality of stations comprises the relay section and at least two of the plurality of network connecting sections, each connected to a respective network such that at least two of the plurality of stations are connected to different networks forming a network system.

6. The routing information generating method according to claim 5, wherein the relay section is a programmable logic controller and wherein routing parameters of an entire network system are automatically generated and stored in the relay section of each of the plurality of stations.

7. The routing information generating method according to claim 3, wherein the routing parameters of an entire network system are automatically updated and the updated routing parameters are stored in the relay section of each of the plurality of stations.

8. The routing information generating method according to claim 3, wherein the routing information comprises presence or absence of a network to which a respective station is connected, a relay presence or absence, a relay destination network number, a relay destination station number, and a relay source station number.

9. The routing information generating method according to claim 3, wherein each of the stations updates the routing information based on the notified routing information without further calculations of an optimal route and validity checks.

10. The routing information generating method according to claim 3, wherein each of the stations generates an initial routing table comprising the routing information based on the notified routing information from the other stations.

11. A routing information generating method in a network system including a plurality of stations each of which includes a relay section, which hold routing information for each of the stations, and one or a plurality of network connecting sections each connected to a network, the routing information generating method comprising:
- a step of the network connecting section of an own station setting routing information held by the own station and delivering the routing information updated based on routing information notified from the relay station on a same base to the network connecting section of another station of an own network;
- a step of the network connecting section of the own station notifying, if new routing information is present in routing information received from the network connecting section of the another station, the relay section on the same base of the routing information; and
- a step of the relay section updating, based on routing information notified from the network connecting section on the same base, routing information held by the relay section,
- wherein, in the notification of the routing information between the relay section and the network connecting section on the same base and transmission and reception between the network connecting sections of the own network, a routing table including items of setting presence or absence corresponding to a network number to which the own station is connected, relay presence or absence of the network number, a relay destination network number, a relay destination station number, and a relay source station number is used for each network.

12. The routing information generating method according to claim 11, wherein the network connecting section sets the setting presence or absence to setting presence during startup of the network system, stores an own station number in the relay source station number, and notifies the relay section on the same base of the routing information.

13. The routing information generating method according to claim 12, wherein the network connecting section sets, in the routing information notified from the relay section, the relay presence or absence of network number of the network connecting sections on the same base excluding the own station, which is set to setting presence, to relay presence, stores an own network number in the relay destination network number, stores an own station number in the relay destination station number, and delivers the routing information to the network connecting section of the another station of the own network.

14. A routing information generating method in a network system including a plurality of stations each of which includes a relay section, which hold routing information for each of the stations, and one or a plurality of network connecting sections each connected to a network, the routing information generating method comprising:
- a step of the network connecting section of an own station setting routing information held by the own station and delivering the routing information updated based on routing information notified from the relay station on a same base to the network connecting section of another station of an own network;
- a step of the network connecting section of the own station notifying, if new routing information is present in routing information received from the network connecting section of the another station, the relay section on the same base of the routing information;
- a step of the relay section updating, based on routing information notified from the network connecting section on the same base, routing information held by the relay section;
- a step of the network connecting section of the own station recognizing parallel-off of the network connecting section of the another station of the own network;
- a step of the network connecting section of the own station disabling routing information to a network for which the paralleled-off connecting section performs relay; and
- a step of the network connecting section of the own station notifying the relay section on the same base of the disabled routing information,
- wherein, when the network connecting section recognizes the parallel-off of the network connecting section of the another station of the own network, the network connecting section sets setting presence or absence of a network number for which the paralleled-off network connecting section performs relay to setting absence and sets setting presence or absence of a network number for performing relay for the network number to setting absence.

* * * * *